(12) United States Patent
Brown

(10) Patent No.: US 6,353,778 B1
(45) Date of Patent: Mar. 5, 2002

(54) AUTOMOBILE COMPUTER CONTROL SYSTEM FOR LIMITING THE USAGE OF WIRELESS TELEPHONES ON MOVING AUTOMOBILES

(75) Inventor: Joe Nathan Brown, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/810,029

(22) Filed: Mar. 15, 2001

(51) Int. Cl.$^7$ ................................................ G05D 1/00
(52) U.S. Cl. .......................... 701/1; 307/10.1; 340/441
(58) Field of Search ................................ 701/1, 93, 97; 340/425.5, 426, 539, 441; 307/10.2, 10.1

(56) References Cited

U.S. PATENT DOCUMENTS 5,131,029 A * 7/1992 Kunstadt .................... 379/355
5,561,712 A * 10/1996 Nishihara .................... 379/355

* cited by examiner

Primary Examiner—Richard M. Camby
(74) Attorney, Agent, or Firm—Volel Emile; Jerry Kraft

(57) ABSTRACT

An automobile computer control system for limiting the usage of wireless telephones in moving automobiles comprising an implementation for sensing when the velocity of the automobile exceeds a predetermined velocity, a wireless implementation for sensing when said wireless telephone is in use by the driver of said automobile and a function responsive to both of said sensing implementations for limiting said use of said wireless telephone by said driver of said automobile when the velocity of the said automobile exceeds said predetermined velocity. For the best safety, the predetermined velocity is any moving velocity. Also, the wireless device for sensing when the velocity of the automobile exceeds a predetermined velocity may be carried out by simple infrared device.

32 Claims, 4 Drawing Sheets

AUTOMOBILE COMPUTER CONTROL SYSTEM FOR LIMITING THE USAGE OF WIRELESS TELEPHONES ON MOVING AUTOMOBILES

TECHNICAL FIELD

The present invention relates to the use of wireless telephones and, particularly, to limiting such use under circumstances presenting safety hazards.

BACKGROUND OF RELATED ART

With the globalization of business, industry and trade wherein transactions and activities within these fields have been changing from localized organizations to diverse transactions over the face of the world, the telecommunication industries have, accordingly, been expanding rapidly. Wireless telephones and, particularly, cellular telephones have become so pervasive that their world wide number is fast approaching one hundred million or more. While the embodiment to be subsequently described relates to cellular telephones, the principles of the invention would be applicable to any wireless personal communication device which could be used to communicate from the inside of an automobile. These would include the wide variety of currently available communicating personal palm devices or Personal Digital Assistants (PDAs), which include, for example, Microsoft's WinCE line; the PalmPilot line produced by 3Com Corp.; and IBM's WorkPad. These devices are comprehensively described in the text, *Palm III & PalmPilot*, Jeff Carlson, Peachpit Press, 1998.

Unfortunately, the use of wireless telephones by drivers of automobiles have been related to an increasing number of automobile accidents. The cellular phone not only requires the use of one or even both of the driver's hands, but also diverts the driver's attention from driving. The problem has become so pronounced that many states and countries have enacted, or are considering the enactment, of legislation banning the use of cell phones by drivers in moving vehicles. Such legislation has been opposed by many who regard it as too intrusive on drivers, as well as too difficult to enforce. However, the problem may be expected to become more pronounced along with the progress of the philosophy of the mobile office where the worker is available "24 hours a day—seven days a week".

Consequently, the wireless telephone, as well as the automotive, industries are seeking solutions to these problems for drivers.

SUMMARY OF THE PRESENT INVENTION

The present invention offers a solution to the problem of cell phone use during driving. The solution will require the involvement of legislation or voluntary action by the handheld wireless phone industry to put a sensing means into the wireless telephone which will detect or sense when the telephone is on or in operation, and then provide a sensor which will respond to a wireless turnoff signal sent by the computer control system of the automobile.

Accordingly, the present invention provides an automobile computer control system for limiting the usage of wireless telephones in moving automobiles comprising: wireless means for sensing when the velocity of the automobile exceeds a predetermined velocity; means for sensing when said wireless telephone is in use by the driver of said automobile; and means responsive to both of said sensing means for limiting said use of said wireless telephone by said driver of said automobile when the velocity of the said automobile exceeds said predetermined velocity. For the best safety, the predetermined velocity is any moving velocity. Also, the wireless means for sensing when the velocity of the automobile exceeds a predetermined velocity may be carried out by simple infrared means, which will be described in greater detail hereinafter.

More particularly, the present invention may involve an automobile computer control system for limiting the usage of wireless telephones in moving automobiles comprising: means in said automobile for emitting a signal towards the driver of the automobile when the velocity of the automobile exceeds a predetermined velocity; means on the wireless telephone for sensing said emitted signal when said wireless telephone is in use by the driver of said automobile; and means responsive to said sensing means for limiting said use of said wireless telephone by said driver of said automobile upon the sensing of said emitted signal. As previously stated, the emitted signal is preferably an infrared signal and, particularly, a narrow beam infrared signal directed towards the driver. In this way, the narrow beam signal is sensed only if said cellular telephone is being used by the driver of said automobile. The means for limiting the use of said wireless telephone may turn off the wireless telephone when the velocity of the automobile exceeds the predetermined velocity; or there may be further included means for notifying the driver that the wireless telephone will be turned off after a brief time period after said sensing that the velocity of the automobile has exceeded said predetermined velocity together with means for delaying the turning off of said wireless telephone for that brief time period.

In accordance with an alternative aspect of the invention, the means for limiting the use of said wireless telephone when the velocity of said automobile exceeds said predetermined velocity, includes means for notifying the service provider of said wireless telephone, whereby said service provider may charge higher rates when said velocity exceeds said predetermined velocity. The means for notifying said service provider may also include means for transmitting, along with the voice data during the driver's use of said wireless telephone, additional data indicating that said velocity exceeds said predetermined velocity.

In accordance with another aspect of the present invention, there may be means permitting the receiving of an incoming telephone transmission on said turned off wireless telephone briefly and means for turning off said incoming transmission after a brief predetermined time period.

Finally, so that emergencies may be handled, there may be means for storing a set of emergency telephone numbers, as well as a means for enabling said turned off wireless telephone to call any one of said set of emergency telephone numbers.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
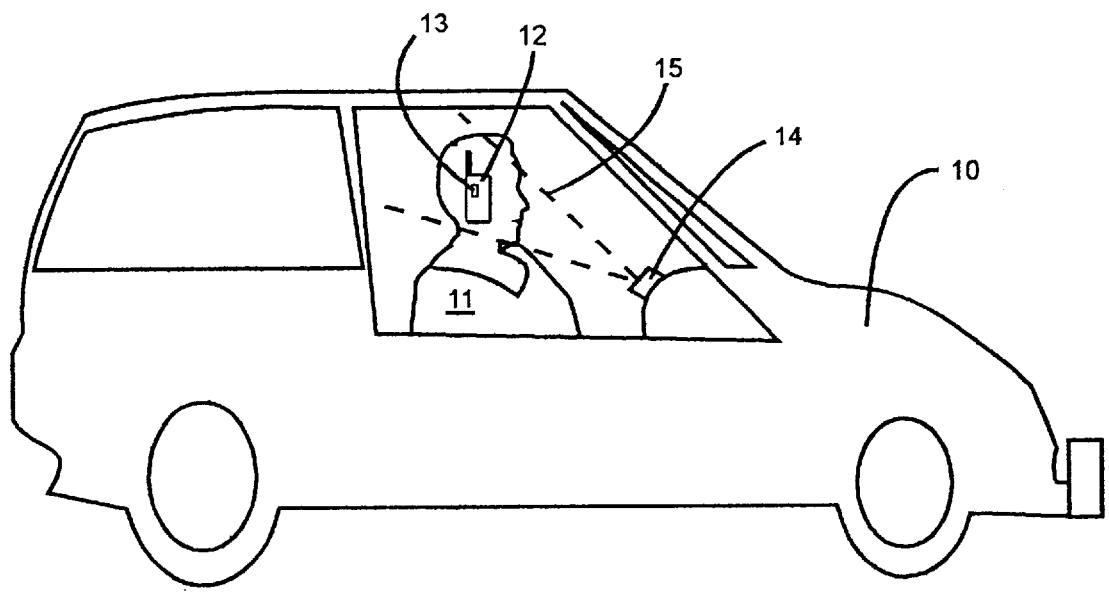
FIG. 1 is a partial breakaway diagrammatic side view of a portion of an automobile arranged so as to illustrate the operation of the invention.
Figure 2:
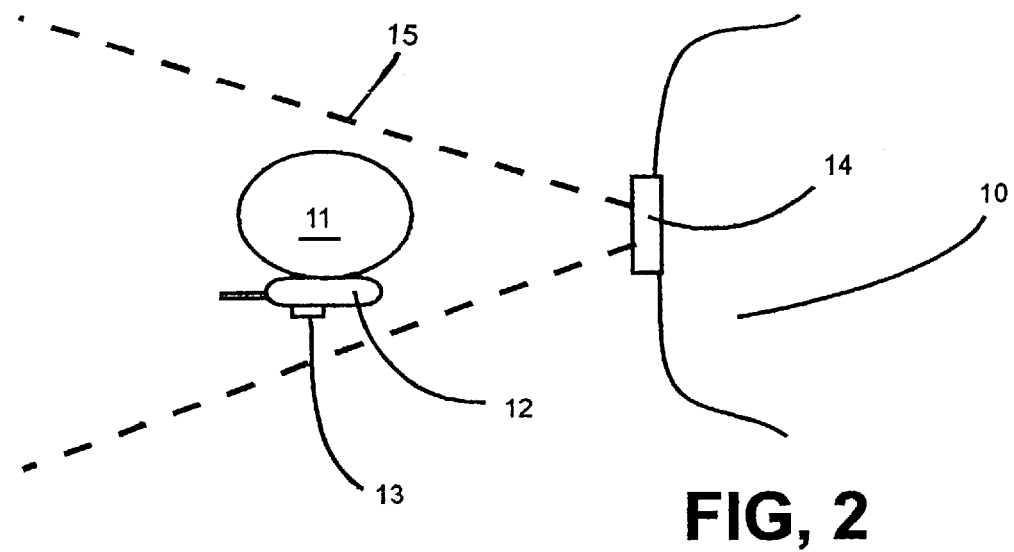
FIG. 2 is a partial top view of the arrangement of FIG. 1 from inside of the automobile.

Referring to FIG. 1, there is provided a diagrammatic side view of a potion of an automobile 10 in which a driver 11 is using a wireless cell phone 12. FIG. 2 is a fragmentary top view of the same elements. A conventional (under ten feet) infrared system is used. Source or emitter 14 emits a narrow beam IR signal at the driver's head, which is usually within two to five feet from the emitter 14. The narrow beam, at that point, need be no more than two feet in diameter. The wireless telephone 12 has an IR port 13 through which emitter 14 may beam data to the telephone. It should be noted that such IR communication ports are already available on most of the currently available wireless communicating personal palm devices or PDAs that were mentioned above.

In order for the present invention to function, such IR ports would have to be added to cellular telephones. Since many of the current and planned cellular phones will be performing a variety of the functions of these communicating PDAs, the IR ports on the cell phones of this invention would be available for such other functions.

Such IR ports are described in detail in the text, *Personal Computer Secrets,* Bob O'Donnell, IDG Books Worldwide Inc., Foster City, Calif., 1999, page 215. The IR signals should conform to the IrDA (Infrared Data Association) standard of at least 1.15 Mbps; but, preferably, about 4 Mbps (FastIrDA). The functioning of the IR ports on wireless palm-type devices, which may function as port 12, are described further in the text, *How to Do Everything with Your Palm Handheld,* Dave Johnson et al., 2000, Osborne/McGraw-Hill, Berkeley, Calif., particularly at pp. 84–90.

When cell phone 12 is in use, the IR port 13 is turned on. As will be described hereinafter in greater detail, the computer control system in the automobile monitors the velocity of the auto to sense when the auto velocity exceeds a preset level, at which the use of a cell phone is determined to present a danger. A reasonable default value is zero velocity, i.e. the use of a cell phone is unsafe at any speed. In such a case, if the vehicle is moving, then emitter 14 will emit a signal within narrow IR beam 15 which will turn off the cell phone immediately or after a warning and a short delay.

Figure 3:
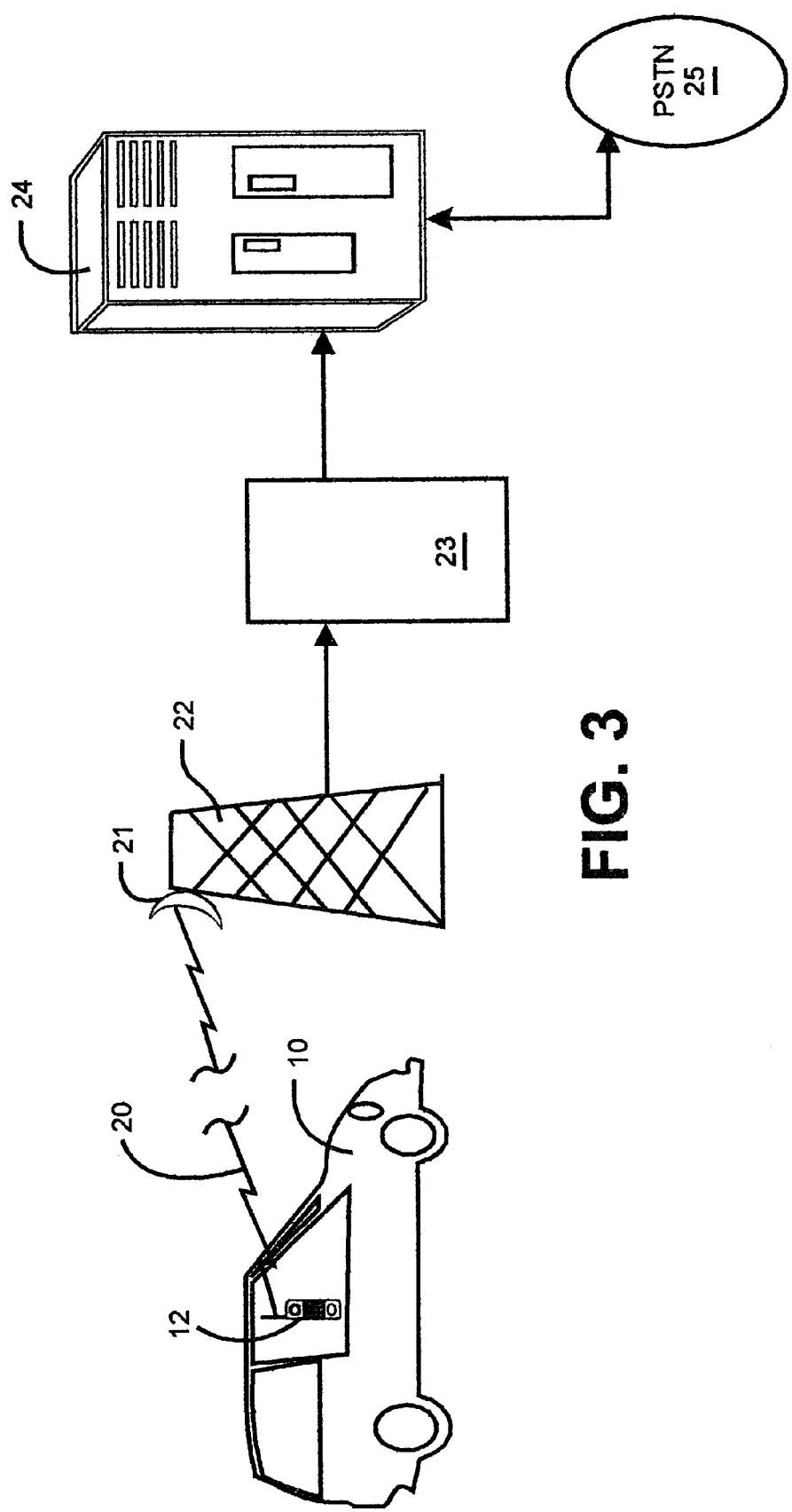
FIG. 3 is a diagrammatic illustration of a cell phone operation used in the embodiment of the invention.

With respect to FIG. 3 there will be described, for background, a simplified typical wireless cell phone 12 transmission to/from and automobile 10. There is shown a generalized diagrammatic view of a portion of a Public Switched Telephone Network (PSTN) 25 showing channel paths to and from the wireless cell phone 12. Mobile or cellular telephones 12 are connected via wireless air interface transmission paths 20 to cell receiving/transmission antenna 21 at site 22. It will also be understood that each illustrative cell site 22 will have many cellular phones with wireless connectability to the respective site. There is a base station 23 respectively associated with site 22 for achieving transmitting/receiving RF communications via the air interfaces 20 to the cellular device 12. The base station 23 is connected to mobile switching center 24. This mobile switching center 24 has many wireless phones connected to it. The center operates to control the channel connections, i.e. switch into and out of the PSTN 30, those calls originated or terminated at the mobile telephones, e.g. cell phone 12. Switching center 24 connects channels from the cellular phone 12 and others into the PSTN 25.

Figure 4:
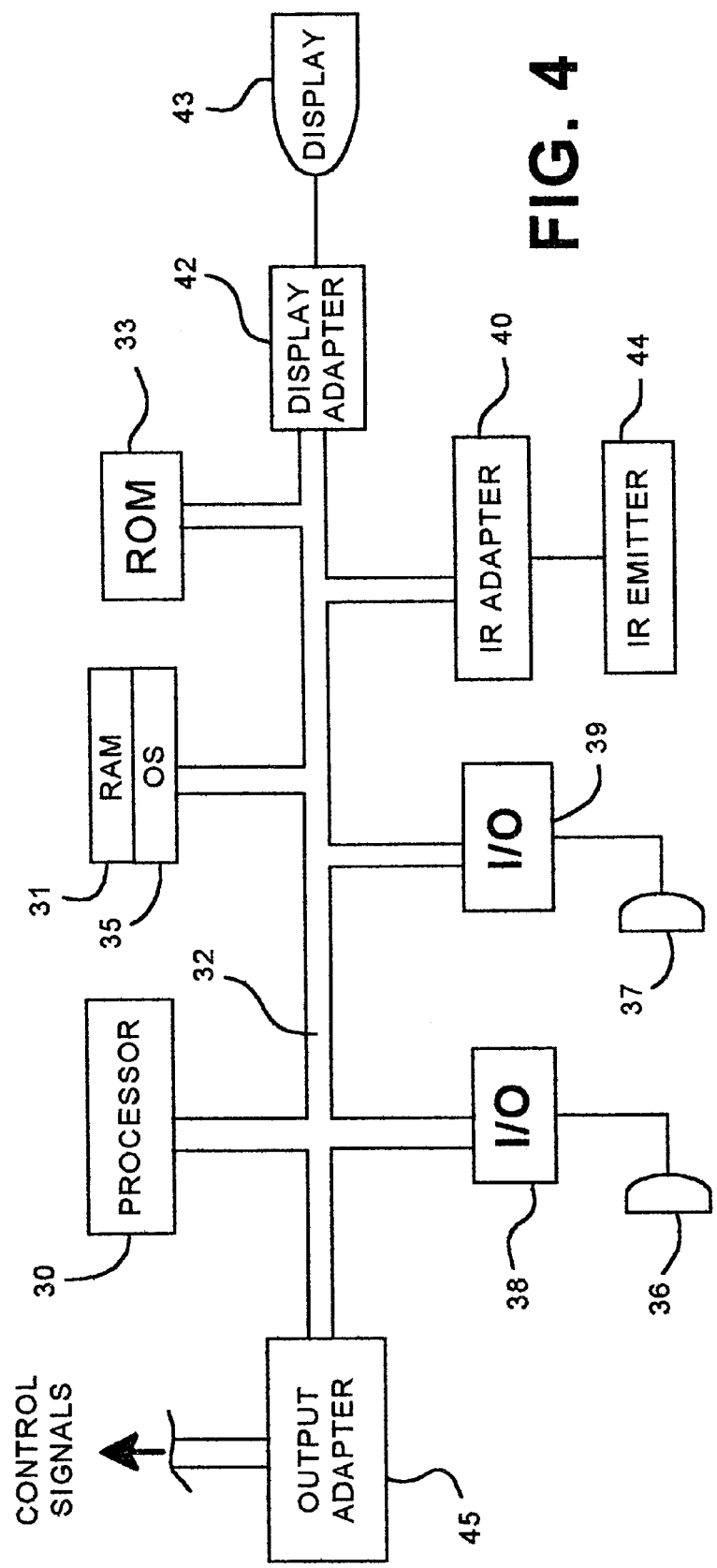
FIG. 4 is a block diagram of a generalized data processing system including a processor unit which provides the onboard automobile computer control for the present invention.

Now, with reference to FIG. 4 there will be described a typical computer control system which may function as an automobile onboard controller for various automotive functions, including the control of wireless telephone use in a moving automobile. A central processing unit 30 is provided and interconnected to various other components by system bus 32. An operating system 35, which runs on processor 30, provides control and is used to coordinate the functions of the various components of the control system. The OS 35 is stored in Random Access Memory (RAM) 31, which in a typical automobile control system has from four to eight megabytes of memory. The programs for the various automobile monitor and control functions are now permanently stored in Read Only Memory (ROM) 33, and moved into and out of RAM to perform their respective functions. This includes the cell phone use control programs of the present invention. The automobile is likely to have a display 43 controlled through display adapter 42 to provide information to the driver. The vehicle control system monitors a wide variety of automobile parameters through representative sensors/ monitors 36 and 37 connected to the processor 30 through their respective I/O adapters 36 and 37. This sensed data is processed and the appropriate responsive control signals are distributed through adapter 45. In the operation of the present invention, when the control system gets feedback through a monitor that the vehicle velocity has exceeded the predetermined maximum for cell phone use, then an appropriate stop phone IR signal is sent out through IR adapter 40 via IR emitter 44 which is received by IR port 13 of wireless phone 12 in FIG. 1.

Figure 5:
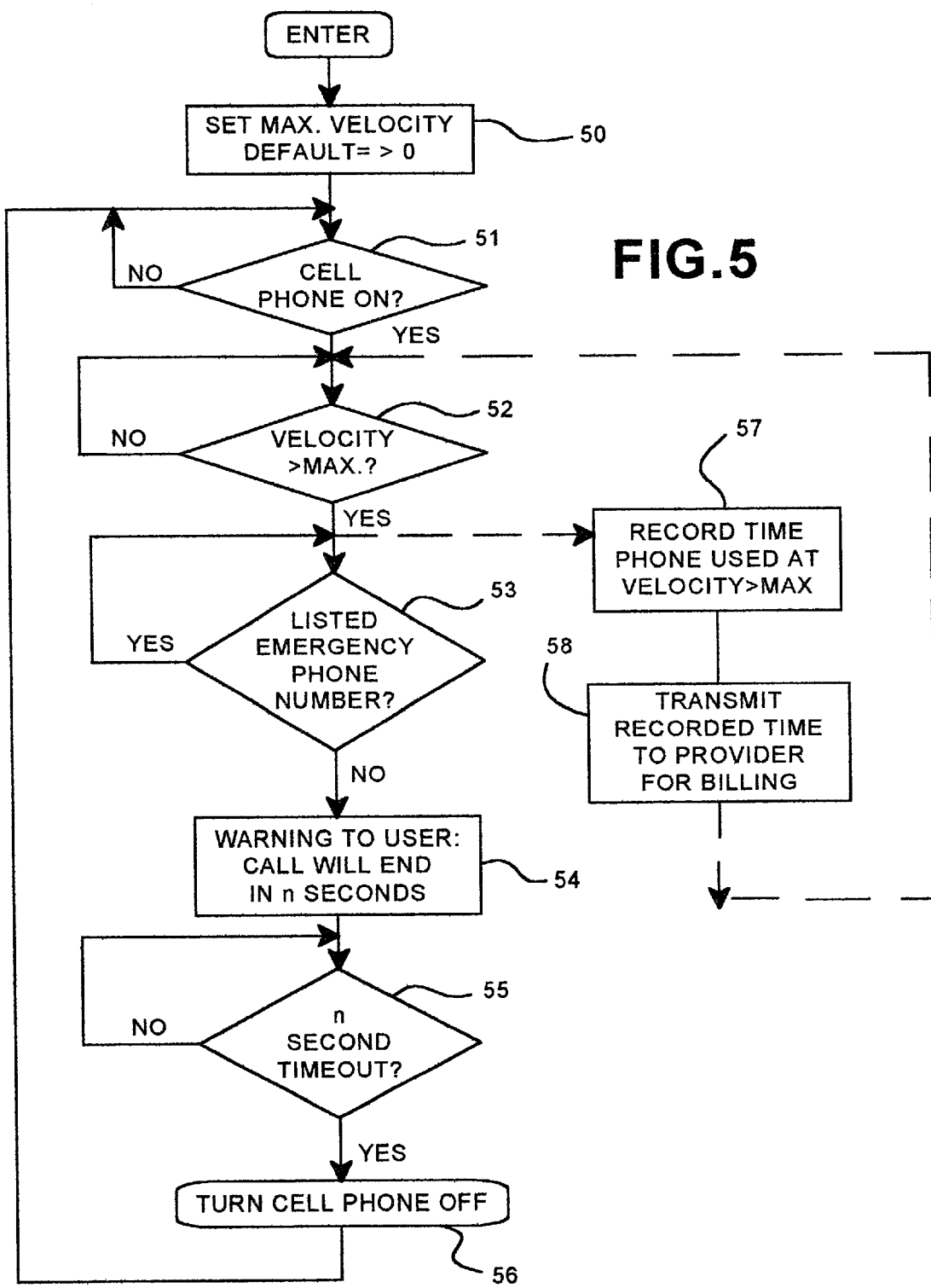
FIG. 5 is a flowchart of the steps involved in applying the system of the present invention to limit the usage of wireless telephones by the driver of a moving automobile.

The running of an illustrative control process, in accordance with the present invention, will now be described with respect to FIG. 5. Initially, a maximum velocity at which the cell phone may be used in the automobile is set, step 50. Let us assume that the default maximum velocity set here by the manufacturer is any velocity greater than zero. However, there may be a provision for the user or any authority controlling cell phone use to adjust such a default maximum velocity. An initial determination is made as to whether the cell phone is in use, step 51. If No, the process is returned to initial step 51 where cell phone use is awaited. If the determination in step 51 is Yes, there is cell phone use, then a further determination is made as to whether the maximum velocity for such use has been exceeded, step 52. If No, the process is returned to step 52 where the velocity continues to be monitored. If Yes, the maximum velocity has been exceeded, then, step 53, a further determination is made as to whether the current phone call is an emergency call. As set forth hereinabove, the user is permitted to list and store a set of emergency numbers such as 911, EMS and Fire services. The call will be compared to this list before being cancelled by the system. Thus, a Yes determination will return the process to step 53 where the emergency call is monitored until terminated. If the decision from step 53 is No, there is no emergency call, then the user is warned that the call will be terminated in a preset number of seconds, step 54. The warning may be a conventional verbal warning over the cell phone, e.g. "This call will be terminated in 15 seconds unless the automobile is stopped.".

This warning, as well as the terminating of the call, may be done simply and directly, e.g. when the maximum velocity for phone use is exceeded, the IR beam is sent irrespective of cell phone use. Then, if the cell phone is in use, the IR port in the phone will be triggered and the delay, as well as the termination of the call, will be carried out by a routine in the phone. This simple approach would be effective for operations where the cell phone is not to be used at any velocity. Thus, if the auto is moving, the IR signal is sent. There is no need for any setting input and control within the automobile's computer system. However, if any sort of maximum velocity control is to be practiced, then it is desirable to have a program in the cell phone controlling the velocity settings, the warning, the delay timeout and the termination of the call. In this operation, the automobile's computer control system would encode the auto's velocity into the beamed IR signal which would be decoded at the cell phone and compared to the maximum velocity already encoded into the cell phone. The result would trigger appropriate warning and termination. With this programming done in the cell phone, the cell phone service provider would be able to update the cell phones firmware, e.g. flash ROM to provide for changes in the permitted maximum velocity. This approach also makes it possible for the service provider to provide for different maximum velocities in different cities or states by simply transmitting new operating parameters over the cellular network.

A determination is then made as to whether the delay period has timed out, step 55. A No returns the process to step 55 where the timeout is awaited. A Yes turns the cell phone off and the process is returned to initial step 51 where another use of the cell phone is awaited.

In a variation of the control of cell phone use, the user may be charged at a very high rate by his cell phone service provider for use of the phone at velocities above the maximum. This option is shown by the dashed line path in FIG. 5 after a Yes decision in step 52 that the maximum velocity had been exceeded. The cell phone is not turned off but the time at a velocity exceeding the maximum is recorded, step 57, that time is provided to the service provider for billing purposes, step 58, and the process is returned to step 52 where the velocity continues to be monitored to determine if it continues to be in excess of the maximum velocity.

Although certain preferred embodiments have been shown and described, it will be understood that many changes and modifications may be made therein without departing from the scope and intent of the appended claims.

What is claimed is:

1. An automobile computer control system for limiting the usage of wireless telephones in moving automobiles comprising:
    wireless means for sensing when the velocity of the automobile exceeds a predetermined velocity;
    means for sensing when said wireless telephone is in use by the driver of said automobile; and
    means responsive to both of said sensing means for limiting said use of said wireless telephone by said driver of said automobile when the velocity of the said automobile exceeds said predetermined velocity.

2. The automobile control system of claim 1 wherein said wireless telephone is a cellular telephone.

3. The automobile control system of claim 2 wherein said predetermined velocity is any moving velocity.

4. The automobile control system of claim 2 wherein said wireless means for sensing are infrared means.

5. An automobile computer control system for limiting the usage of wireless telephones in moving automobiles comprising:
    means in said automobile for emitting a signal towards the driver of the automobile when the velocity of the automobile exceeds a predetermined velocity;
    means on the wireless telephone for sensing said emitted signal when said wireless telephone is in use by the driver of said automobile; and
    means responsive to said sensing means for limiting said use of said wireless telephone by said driver of said automobile upon the sensing of said emitted signal.

6. The automobile control system of claim 5 wherein said wireless telephone is a cellular telephone.

7. The automobile control system of claim 6 wherein said predetermined velocity is any moving velocity.

8. The automobile control system of claim 6 wherein said means in said automobile for emitting said signal emits an infrared signal.

9. The automobile control system of claim 8 wherein said means on said wireless telephone for sensing said emitted signal comprises infrared signal sensing means.

10. The automobile control system of claim 9 wherein said means in said automobile for emitting said signal emits a narrow beam infrared signal directed towards the driver, whereby said narrow beam signal is sensed only if said cellular telephone is being used by the driver of said automobile.

11. The automobile control system of claim 1 wherein said means for limiting the use of said wireless telephone turns off said wireless telephone when the velocity of said automobile exceeds said predetermined velocity.

12. The automobile control system of claim 11 further including:
    means for notifying the driver that the wireless telephone will be turned off after a brief time period after said sensing that the velocity of the automobile has exceeded said predetermined velocity; and
    means for delaying the turning off of said wireless telephone for said brief time period.

13. The automobile control system of claim 1 wherein said means for limiting the use of said wireless telephone when the velocity of said automobile exceeds said predetermined velocity includes means for notifying the service provider of said wireless telephone, whereby said service provider may charge higher rates when said velocity exceeds said predetermined velocity.

14. The automobile control system of claim 13 wherein said means for notifying said service provider includes:
    means for transmitting, along with the voice data during the driver's use of said wireless telephone, additional data indicating that said velocity exceeds said predetermined velocity.

15. The automobile control system of claim 11 further including:
    means permitting the receiving of an incoming telephone transmission on said turned off wireless telephone; and
    means for turning off said incoming transmission after a brief predetermined time period.

16. The automobile control system of claim 11 further including:
    means for storing a set of emergency telephone numbers; and
    means for enabling said turned off wireless telephone to call any one of said set of emergency telephone numbers.

17. A computer controlled method for limiting the usage of wireless telephones in moving automobiles comprising:
    sensing when the velocity of the automobile exceeds a predetermined velocity;
    wirelessly sensing when said wireless telephone is in use by the driver of said automobile; and limiting said sensed use of the wireless telephone by the driver of said automobile when the sensed velocity of the said automobile exceeds said predetermined velocity.

18. The method of claim 17 wherein said wireless telephone is a cellular telephone.

19. The method of claim 18 wherein said predetermined velocity is any moving velocity.

20. The method of claim 18 wherein said step of wirelessly sensing is sensing of infrared emissions.

21. A computer controlled method for limiting the usage of wireless telephones in moving automobiles comprising:

emitting in said automobile a signal towards the driver of the automobile when the velocity of said automobile exceeds a predetermined velocity;

sensing the emitted signal on the wireless telephone when said wireless telephone is in use by the driver of the automobile; and limiting said use of said wireless telephone by the driver of the automobile upon the sensing of said emitted signal.

22. The method of claim 21 wherein said wireless telephone is a cellular telephone.

23. The method of claim 22 wherein said predetermined velocity is any moving velocity.

24. The method of claim 22 wherein said step of emitting said signal emits an infrared signal.

25. The method of claim 24 wherein said step of sensing said emitted signal comprises infrared signal sensing.

26. The method of claim 25 wherein said step in said automobile for emitting said signal emits a narrow beam infrared signal directed towards the driver, whereby said narrow beam signal is sensed only if said cellular telephone is being used by the driver of said automobile.

27. The method of claim 17 wherein said step of limiting the use of said wireless telephone turns off said wireless telephone when the velocity of said automobile exceeds said predetermined velocity.

28. The method of claim 27 further including the steps of:

notifying the driver that the wireless telephone will be turned off after a brief time period after said sensing that the velocity of the automobile has exceeded said predetermined velocity; and delaying the turning off of said wireless telephone for said brief time period.

29. The method of claim 17 wherein said step of limiting the use of said wireless telephone when the velocity of said automobile exceeds said predetermined velocity includes notifying the service provider of said wireless telephone, whereby said service provider may charge higher rates when said velocity exceeds said predetermined velocity.

30. The method of claim 29 wherein said step of notifying said service provider includes the steps of:

transmitting, along with the voice data during the driver's use of said wireless telephone, additional data indicating that said velocity exceeds said predetermined velocity.

31. The method of claim 27 further including the steps of:

permitting the receiving of an incoming telephone transmission on said turned off wireless telephone; and turning off said incoming transmission after a brief predetermined time period.

32. The method of claim 27 further including the steps of:

storing a set of emergency telephone numbers; and enabling said turned off wireless telephone to call any one of said set of emergency telephone numbers.

* * * * *